United States Patent [19]
Stehle

[11] 3,809,192
[45] May 7, 1974

[54] BRAKE DISK FOR DISK BRAKES

[75] Inventor: Heinz Stehle, Stuttgart-Zuffenhausen, Germany

[73] Assignee: Firma Dr. Ing. h.c.F. Porsche KG, Stuttgart-Zuffenhausen, Germany

[22] Filed: Oct. 10, 1972

[21] Appl. No.: 295,954

[30] Foreign Application Priority Data
Mar. 25, 1970  Germany.......................... 7011084

[52] U.S. Cl. 188/218 XL, 188/264 AA, 192/107 R, 192/113 A
[51] Int. Cl............................................ F16d 65/12
[58] Field of Search..... 188/264 A, 264 AA, 264 E, 188/218 XL, 71.6, 73.2; 192/70.12, 70.14, 107 R, 113 A, 113 B

[56] References Cited
UNITED STATES PATENTS

| | | | |
|---|---|---|---|
| 1,912,716 | 6/1933 | Lane | 192/107 R |
| 2,451,709 | 10/1948 | Baselt | 188/218 XL X |
| 2,473,040 | 6/1949 | Schlegel, Jr. | 188/264 A |
| 2,584,192 | 2/1952 | Danly et al. | 188/71.6 X |
| 2,727,594 | 12/1955 | Ganster, Jr. | 188/264 E X |
| 2,879,872 | 3/1959 | Van Ranst | 192/70.12 X |

Primary Examiner—George E. A. Halvosa
Attorney, Agent, or Firm—Craig and Antonelli

[57] ABSTRACT

A brake disk for disk brakes, especially for high performance passenger motor vehicles, of the type having friction surfaces which are brought into friction contact with friction members of the disk brakes during braking operations. A plurality of recesses penetrating inwardly from the braking surfaces are provided for assisting in the cooling of the brake disk. The recesses are arranged in a uniform pattern over the braking surfaces along dividing lines interconnecting the centers of the recesses. In one preferred embodiment, the dividing lines are of zig-zag shape and are arranged symmetrically with respect to radii of the brake disk. Another preferred embodiment of the present invention arranges the dividing line as single or multiple spirals which extend spirally around the center of the brake disk. Another preferred embodiment arranges the dividing lines as curved vane-wheel blade shaped lines which are spaced from one another to exhibit a vane wheel configuration when viewed in a plane parallel to the braking surface. The preferred recess patterns may be arranged in either solid or ventilated brake disk. In the solid brake disk embodiments, the recesses may extend either partly or completely through the brake disk. In the ventilated brake disk embodiments, the recesses extend through the brake disk and communicate with the hollow ventilating spaces between the portions of the brake disk. The recesses preferably partially overlap connecting webs between the two sections of the brake disk.

27 Claims, 15 Drawing Figures

BRAKE DISK FOR DISK BRAKES

This application is a continuation-in-part of my copending application Ser. No. 125,255, filed Mar. 17, 1971, now abandoned.

BACKGROUND AND SUMMARY OF THE INVENTION

The present invention relates to a brake disk for use with disk brakes on vehicles, especially for high performance motor vehicles.

The disk brakes of high performance vehicles must convert the velocity or kinnetic energy of the vehicle quickly and reliably into heat energy and then transmit this heat energy to the environmental or ambient air. U.S. Pat. No. 2,765,881, shows that it is conventional to attempt to fulfill these requirements by constructing a disk brake with an internally ventilated brake disk which is provided with three friction surfaces between which the cooling air is discharged for purposes of good ventilation. A disadvantage with the arrangement of this patent resides in that the lateral ventilating openings require an enlarged diameter and, therefore, an increase in the weight of the brake disk.

Another conventional brake disk is provided with slots in the area of the friction surfaces, which slots terminate inside the brake disk in bores. A disadvantage with this slot and bore arrangement relates to the prevention of noise conditions related to resonance phenomenom occurring in the brake disk during use. Also, the arrangement of slots at the outer region of the friction surfaces considerably weakens the brake disk and the brake members cooperating therewith are subjected to extensive uneven wear.

It is contemplated by the present invention to provide a brake disk which, in addition to having a small weight, possesses a high braking capability without causing excessive wear to the brake members cooperating with the brake disk and to the brake disks themselves. The present invention also contemplates the provision of a brake disk which has enhanced cooling characteristics while maintaining high strength and reliability.

Specifically, the present invention contemplates a brake disk having a novel configuration of recesses extending inwardly from the braking surfaces for aiding in the cooling of the brake disk. Each of the arrangements or patterns of the recesses extending inwardly from the braking friction surfaces exhibits the advantage that the strength of the brake disk in the radial direction is maximized while also maximizing the number of recesses formed over the entire area of the braking surfaces. Three different pattern configurations for the cooling recesses are contemplated by this invention. In a first embodiment, the recesses are arranged in a substantially uniform "star" pattern along a plurality of dividing lines interconnecting the centers of the recesses, which dividing lines are each of zig-zag shape extending symmetrically with respect to a radius of the brake disk. In a second embodiment of the present invention, the recesses are uniformly arranged on at least one spirally shaped dividing line extending over the surface of the brake disk with the center of the brake disk being the center of the spiral curve or curves. In a third embodiment of the present invention, the recesses are arranged on a plurality of dividing lines interconnecting the centers of the recesses, which dividing lines each exhibit a curved vane-wheel blade or "screw-like" shape and which are spaced from one another to exhibit a vane wheel configuration when viewed in a plane parallel to the braking surfaces. In each of these three basic pattern embodiments, the total number of recesses is optimized while also maximizing the radial distance between adjacent recesses so as to preserve the strength characteristics of the brake disk. Since the force loading on the brake disk is relatively strong in the radial direction, this enhancement of the thickness between adjacent recesses in the radial direction optimizes the overall strength characteristics of the brake disk without limiting the total number of recesses that can be arranged in a given braking surface area.

The present invention contemplates the arrangement of the above-described pattern of recesses with the recesses extending either partially or completely through solid brake disks.

The present invention also contemplates preferred embodiments of ventilated brake disk having connecting webs interconnecting two parallel spaced brake disk portions so as to form a plurality of hollow ventilating spaces between the portions. In several embodiments of the present invention, the recesses extend inwardly through the disk portions at positions spaced from the connecting webs. However, in other particularly preferred embodiments of the present invention, the recesses extend at least partially through the connecting webs. The arrangement of the recesses in a particular zig-zag, spiral, or vane-wheel configuration, so as to intersect the connecting webs provides for a particularly advantageous cooling of the brake disk, while maintaining the strength of the webs in the more heavily loaded radial direction. That is, since the cooling recesses extending from the friction braking surfaces intersect the connecting webs, a particularly good heat conductance is obtained in conjunction with a particularly good heat convection due to the communication of the recesses and the hollow ventilating spaces, while the particular recess pattern configuration are such as to maximize the radial distance between adjacent recesses intersecting with the webs so as to substantially reduce the weakening effect of the recesses on the webs.

It is further contemplated by the present invention to arrange the connecting webs along radii of the brake disk for the zig-zag recess pattern, with adjacent recesses being arranged at alternate sides of the connecting web. With the spiral shaped pattern of recesses, the connecting webs preferably are constructed along brake disk radii, with recesses intersecting a particular connecting web being arranged at respective alternate opposite sides of the connecting web. With the vane-wheel pattern of recesses contemplated by the present invention, the connecting webs are constructed parallel to the dividing lines for each of the vane-wheel "blade" shaped sets of recesses, with all of the recesses on a given dividing line being at one side of the respective connecting web.

The present invention also contemplates the arrangement of recesses along a given dividing line at equal distances from one another. The present invention also contemplates preferred embodiments wherein the recesses are formed as cylindrical bores extending perpendicularly to the friction surfaces of the brake disk.

The above discussed and further aims, objects, features, and advantages of the present invention will become more apparent from the following description when taken in conjunction with the accompanying drawing, which shows for purposes of illustration only, several embodiments in accordance with the present invention.

DETAILED DESCRIPTION OF THE DRAWINGS

Figure 1:
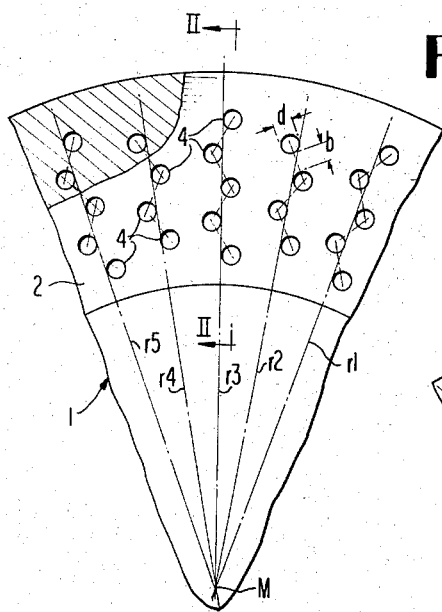
FIG. 1 is a partial plan view of a first embodiment of a brake disk according to the present invention, wherein the recesses are arranged on zig-zag shaped dividing lines arranged symmetrically with respect to radii of the brake disk.
Figure 2:
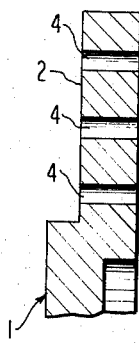
FIG. 2 is a cross-sectional view taken along section II—II of FIG. 1 showing recesses extending completely through a solid wall brake disk.

Referring now to the drawings, wherein corresponding reference numerals are used throughout the various views to designate like parts, and particularly to FIGS. 1 and 2, the brake disk 1 of the brake installation for a passenger motor vehicle is provided with two annular friction braking surfaces 2, 3 at the outer circumferential zone of the brake disk. The annular friction braking surfaces 2 and 3 are arranged parallel to one another and extend perpendicular to the axis of rotation M of the brake disk 1. A plurality of recesses 4 are arranged in a regular pattern on the braking surfaces and extend inwardly of the brake disk in a direction perpendicular to the braking surfaces 2 and 3. In the embodiment of FIG. 1, these recesses 4 are arranged in respective zig-zag patterns extending along respective radii $r_1, r_2 ...$ of the brake disk 1.

The recesses 4 are preferably spaced from one another a distance $b$ corresponding to the diameter $d$ of the individual recesses. By so arranging the recesses 4 in the zig-zag pattern along the respective radii of the brake disk 1, the number of recesses that can be provided in the friction braking surfaces is maximized while minimizing the reduction in strength of the brake disk in the radial direction.

Figure 3:
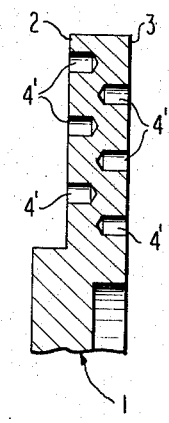
FIG. 3 is a cross-sectional view showing recesses along section II—II of FIG. 1 which extend only partially through the thickness of a solid wall brake disk.

FIGS. 2 and 3 show optional arrangements for the recesses, with FIG. 2 showing the recesses 4 extending completely through the solid brake disk 1 and FIG. 3 showing recesses 4' extending only partially, and preferably to adjacent the mid-point of the brake disk.

Figure 4:
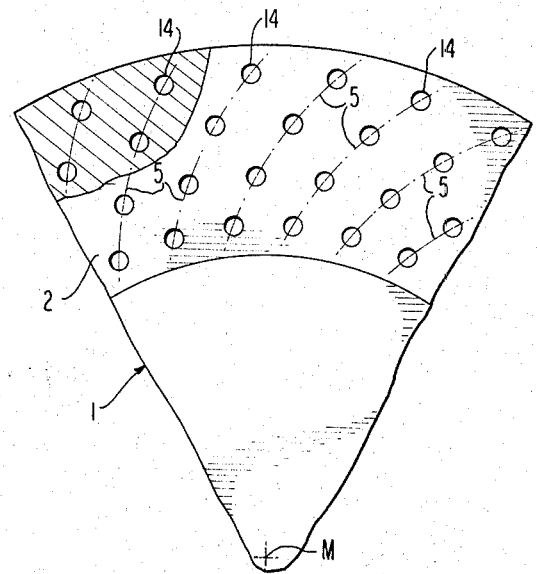
FIG. 4 is a partial plan view of a further embodiment of a brake disk in accordance with the present invention, wherein the recesses are arranged along curved vane-wheel blade shaped dividing lines which are spaced from one another to exhibit a vane wheel configuration to the overall recess pattern of the brake disk.

FIG. 4 illustrates another embodiment of the present invention wherein the recesses 14 are uniformly spaced along the dividing line 5 (indicated in dashed lines) which are curved in a vane-wheel blade shape. That is, the dividing lines 5 are arranged similarly to the vane-wheel blades on a turbine wheel or the like and exhibit a uniformly curved surface. The dividing lines 5 are all arranged with their concave sides facing in one circumferential direction of the rotor 1 and their convex sides facing in the other circumferential direction. In this FIG. 4 arrangement, the recesses 14 are preferably spaced from one another along a given dividing line by an amount equal to the diameter of the recesses.

The recesses 14 may extend either completely through the brake disk 1 in a manner similar to the recesses 4 of FIG. 2, or they may alternatively extend only partially through the brake disk in a manner similar to recesses 4' shown in FIG. 3.

Figure 5:
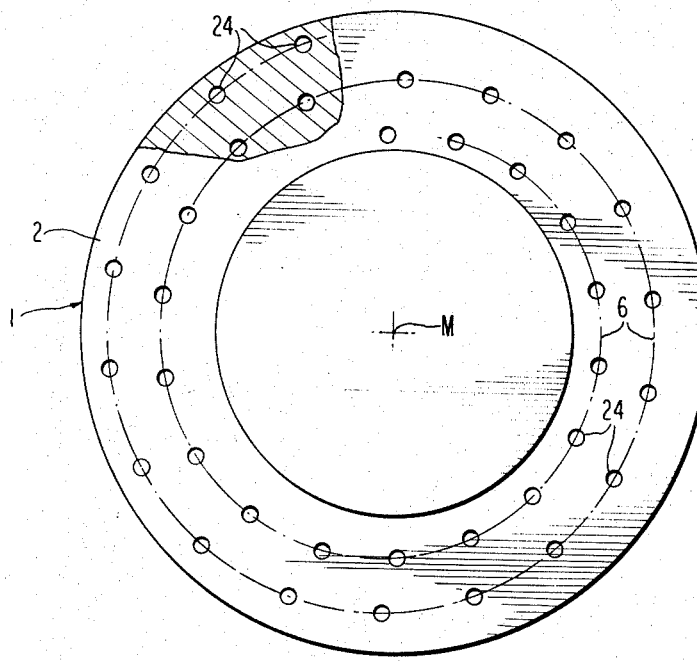
FIG. 5 is a plan view of a further embodiment of a brake disk according to the present invention, wherein the recesses are arranged in a spiral pattern.

FIG. 5 illustrates a third basic pattern arrangement for the recesses in a rotor disk according to the present invention. In this FIG. 5, recesses 24 are arranged along one or more spiral paths 6 arranged around the central axis of rotation M of the brake disk. The recesses 24 are arranged on the spiral dividing lines 6 in a uniform manner over the annular shaped braking surfaces 2 and 3 with radially adjacent recesses being spaced circumferentially from one another. These recesses 24 are advantageously spaced a distance corresponding to the diameter of the recesses from one another. As discussed above with respect to the recess patterns of FIGS. 1 and 4, these recesses 24 may extending either completely through the brake disk or only partially therethrough.

Figure 6:
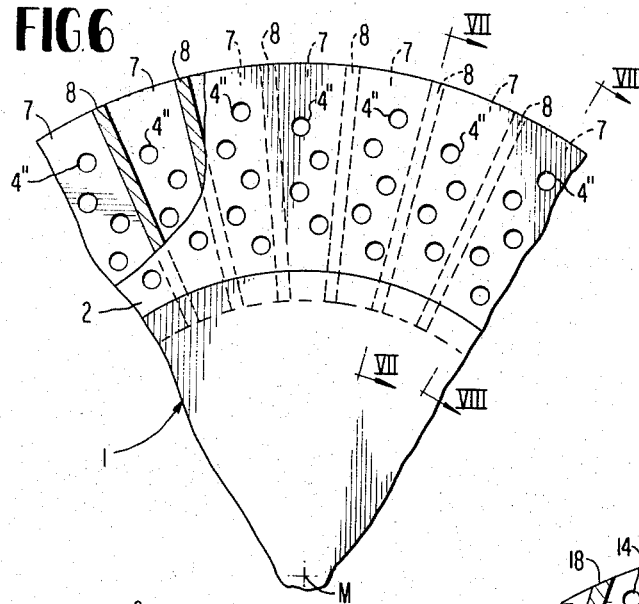
FIG. 6 is a partial plan view, showing portions in cross-section, of a ventilated brake disk embodiment according to the present invention, which has a recess pattern corresponding to that of FIG. 1.

FIG. 6 illustrates a further embodiment of the present invention which includes hollow ventilating spaces 7 formed between connecting webs 8 arranged between two parallel disk-shaped parts 9 and 10. These disk-shaped parts 9 and 10 have the braking surfaces 2 and 3 arranged respectively thereon. Recesses 4'' extend completely through the two disk parts 9 and 10 and communicate freely with the hollow ventilating spaces 7. These recesses 4 are arranged in a zig-zag pattern corresponding to the above-described FIG. 1 arrangement. Since the recesses 4'' communicate directly with the hollow ventilating spaces 7, a particularly advantageous cooling of the brake disk is obtained.

Figure 7:
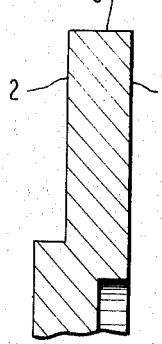
FIG. 7 is a partial cross-sectional view taken along section VII—VII of FIG. 6.
Figure 9:
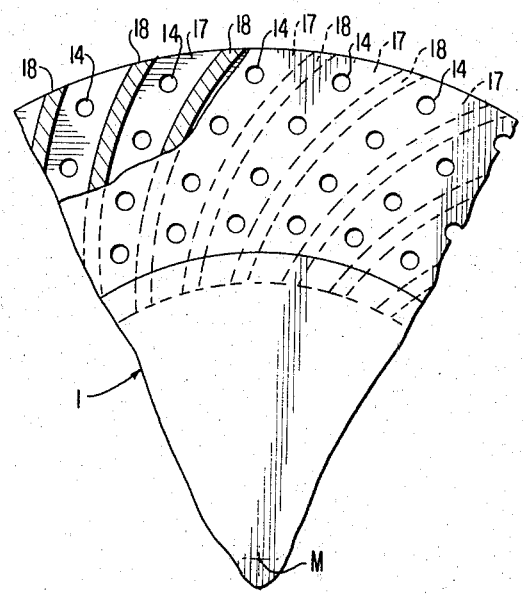
FIG. 9 is a partial plan view, showing portions in cross-section, of a ventilated brake disk embodiment according to the present invention which has a recess pattern corresponding to the pattern of FIG. 4.
Figure 8:
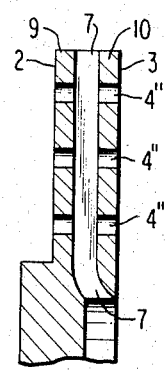
FIG. 8 is a partial cross-sectional view taken along section VIII—VIII of FIG. 6.

A further ventilated brake disk embodiment is illustrated in FIG. 9, wherein follow ventilating spaces 17 are formed between respective webs 18, which webs extend in a vane-like manner parallel to the respective rows of recesses 14, it being noted that the recess pattern corresponds to the pattern described for FIG. 4 above. Since the cross-sectional views along the webs 18 and along the recess 14 of FIG. 9 correspond generally to the cross-sectional views of FIGS. 7 and 8 for the FIG. 6 embodiment, a detailed further illustration and description of the FIG. 9 embodiment is not included herein. In this connection, it is noted that the recesses 14 of FIG. 9 extend completely through two parts of the brake disk and communicate with the hollow ventilating spaces 17.

Figure 10:
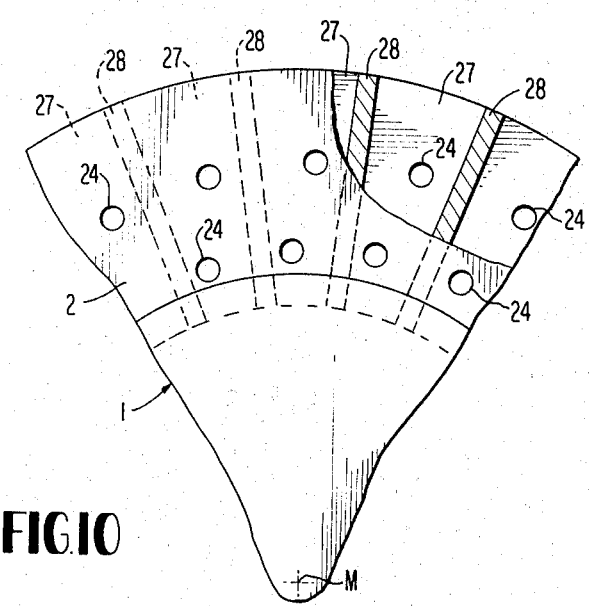
FIG. 10 is a partial plan view, showing portions in cross-section, of a ventilated brake disk embodiment with a recess pattern corresponding to that of FIG. 5.

FIG. 10 shows a still further ventilated brake disk embodiment, wherein webs 28 interconnect two disk parts (not shown but corresponding to the disk parts 9 and 10 of the FIG. 6 embodiment described above), to form hollow ventilating spaces 27 therebetween. The recesses 24 are arranged in a spiral pattern corresponding to the pattern described above for FIG. 5.

Figure 11:
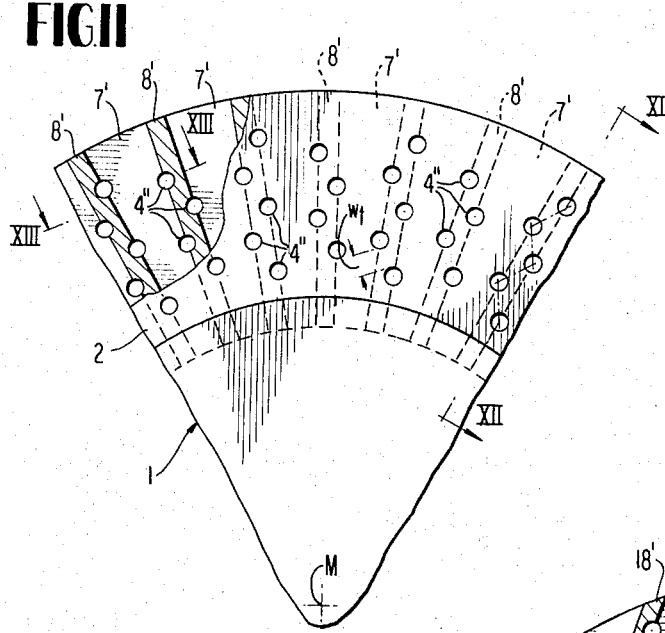
FIG. 11 is a partial plan view, showing portions in cross-section, of a ventilated brake disk embodiment with a zig-zag pattern of recesses intersecting the connecting webs.
Figure 12:
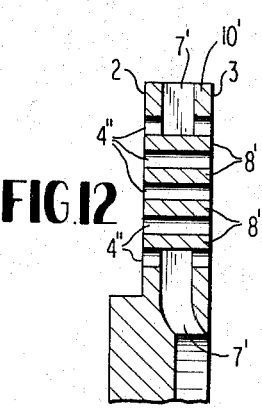
FIG. 12 is a partial cross-sectional view taken along section XII—XII of FIG. 11.

FIG. 11 relates to a further preferred embodiment of a ventilated brake disk, which is similar to the FIG. 6 embodiment, except that the connecting webs 8' are intersected by the recesses 4''. The recesses 4'' and connecting webs 8' intersect so that approximately one-half of the cross-sectional area of the recesses 4'' is surrounded by the connecting web structure. As best seen in FIG. 12, the brake disk of FIG. 11 is constructed of two disk shaped 9' and 10' interconnected by the connecting webs 8'. By arranging the recesses 4' to extend through the connecting webs 8', the cooling of the brake disk is enhanced due to the flow of air or fluid through the recesses 4'' along the connecting webs. Also, by arranging the recesses 4'' in a zig-zag pattern, with respective adjacent recesses 4'' being at opposite sides of a particular connecting webs, the overall strength of the brake disk in the radial direction is only slightly limited due to the maximization of the radial thickness $w_t$ between the recesses.

Figure 13:
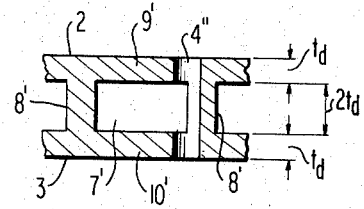
FIG. 13 is a partial cross-sectional view taken along section XIII—XIII of FIG. 11.

The cross-sectional view illustrated in FIG. 13 shows a preferred arrangement for the relative thickness of the parts 9' and 10' with respect to the thickness of the ventilating spaces 7'. Each of the disk parts 9' and 10' are constructed of a thickness $t_d$, while the hollow space 7' is constructed of a thickness corresponding to $2_{td}$.

Figure 14:
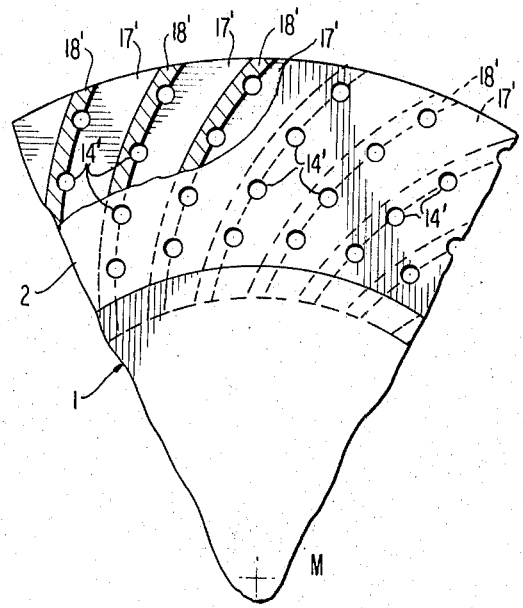
FIG. 14 is a partial plan view, showing portions in cross-section, of a ventilated brake disk embodiment of the present invention which is similar to FIG. 9 except that the recesses intersect the connecting webs.

A further ventilated brake disk embodiment is illustrated in FIG. 14. This embodiment is similar to the embodiment of FIG. 9, except that the connecting webs 18' and the recesses 14' are arranged to intersect one another. Preferably, the recesses 14' overlap the connecting webs 18' a distance corresponding to half the cross-sectional width of the recesses 14'. With this arrangement, the conduction of cooling fluid through the recesses 14' to the hollow spaces 17' is maintained, while also optimizing cooling effects due to the location of the recesses 14' immediately in conjunction with the connecting webs 18'. Since the pattern configuration of the recesses 14' optimizes the radial thickness $w_t$ of the connecting webs 18' between adjacent recesses 14, the advantageous cooling arrangement is obtained without unduly sacrificing the total strength of the brake disk.

Figure 15:
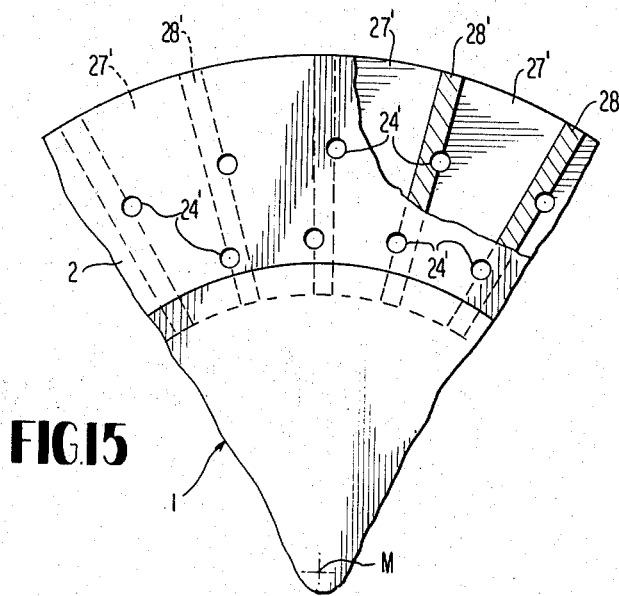
FIG. 15 is a partial plan view, showing portions in cross-section, of a brake disk embodiment according to the present invention similar to FIG. 10 except that the recesses intersect the connecting webs.

A further embodiment of a ventilated brake disk according to the present invention is illustrated in FIG. 15, wherein the recesses 24' are arranged in a spiral-like manner similar to the recesses 24 of FIG. 10 described above. This FIG. 15 embodiment differs from the FIG. 10 embodiment in that the connecting webs 28' are arranged so as to intersect each of the recesses 24' with an overlap of approximately one-half the cross-sectional area of the recesses 24'. With this FIG. 15 embodiment, in a manner similar to that discussed above with respect to the embodiments of FIGS. 12 and 14, optimum cooling effects are obtained with a minimum loss in the radial strength of the brake disk. Therefore, optimum utilization of the recesses 24 and the hollow ventilating spaces 27' is obtained. Since the cross-sectional characteristics of the intersection of an individual recess 24' and connecting web 28' corresponds to that shown in FIG. 13 for webs 8' and recesses 4'', a detailed illustration and description of this feature is not included. Also, the cross-sectional intersection of recesses 14' and connecting webs 18' of the FIG. 14 embodiment has not been included since this feature is adequately illustrated and described with respect to FIG. 13.

In addition to having the above-described advantageous thermal and strength characteristics, the various brake disk embodiments of the present invention also exhibit the advantage that they are simple to construct and very reliable in use. In this connection, since the recesses are formed as cylindrically shaped bores, a simple drilling operation is sufficent for forming the same in the brake disk.

While I have shown and described several embodiments in accordance with the present invention, it is to be clearly understood that the same is susceptible of numerous changes and modifications as will be apparent to one skilled in the art. I, therefore, do not wish to be limited to the details shown and described herein, but intend to cover all such changes and modifications as are encompassed by the scope of the present invention.

I claim:

1. A brake disk for vehicle disk brakes, especially for use with high performance vehicles, comprising friction surface portions having braking friction surfaces for frictionally engaging corresponding friction members of the vehicle disk brakes, and a plurality of recesses extending inwardly into said friction surface portions from said braking friction surfaces for aiding in the cooling of the brake disk, wherein said recesses are arranged in a substantially uniform pattern along a plurality of dividing lines interconnecting the centers of adjacent recesses, each of said dividing lines being of zig-zag shape and being symmetrically arranged with respect to a radius of said brake disk, wherein said braking surfaces are formed as two oppositely facing parallel annular shaped surfaces arranged at respective opposite sides of said brake disk, wherein said brake disk is constructed of two disk-shaped parts interconnected with one another by connecting webs, one of said braking surfaces being on one disk-shaped part and the other braking surface being on the other disk-shaped part, wherein hollow ventilating spaces delimited by said disk-shaped parts are formed between adjacent connecting webs, wherein said recesses extend through said disk-shaped parts into said hollow ventilating spaces, and wherein each of said recesses extend into said hollow ventilating spaces in such a manner as to intersect with portions of said connecting webs.

2. A brake disk according to claim 1, wherein said recesses extend completely through said brake disk.

3. A brake disk according to claim 1, wherein said two disk-shaped parts are of the same thickness, and wherein the thickness of the hollow ventilating spaces is approximately twice the thickness of one of said disk-shaped parts.

4. A brake disk according to claim 1, wherein all of said recesses are of the same size and shape.

5. A brake disk according to claim 4, wherein all of said recesses are constructed as circular cross-section bores.

6. A brake disk according to claim 1, wherein each of said recesses extend through both of said disk-shaped parts with approximately one half of the recess cross-sectional area overlapping one of said webs.

7. A brake disk according to claim 6, wherein adjacent recesses along a particular dividing line are spaced from one another a distance corresponding to the diameter of said recesses.

8. A brake disk according to claim 6, wherein adjacent recesses along a particular dividing line are arranged at opposite sides of the middle of a connecting web.

9. A brake disk according to claim 8, wherein each of said connecting webs extend along a radius of said brake disk.

10. A brake disk according to claim 9, wherein said recesses are all constructed as similar size cylindrical bores, and wherein adjacent recesses along a particular dividing line are spaced from one another a distance corresponding to the diameter of said recesses.

11. A brake disk according to claim 10, wherein said two disk-shaped parts are of the same thickness, and wherein the thickness of the hollow ventilating spaces is approximately twice the thickness of one of said disk-shaped parts.

12. A brake disk for vehicle disk brakes, especially for use with high performance vehicles, comprising friction surface portions having braking friction surfaces for frictionally engaging corresponding friction members of the vehicle disk brakes, and a plurality of recesses extending inwardly into said friction surface portions from said braking friction surfaces for aiding in the cooling of the brake disk, wherein said recesses are arranged in a substantially uniform pattern along at least one dividing line interconnecting the centers of said recesses, said at least one dividing line being of spiral shape with respect to the axis of rotation of said brake disk, wherein said braking surfaces are formed as two oppositely facing parallel annular shaped surfaces arranged at respective opposite sides of said brake disk, wherein said brake disk is constructed of two disk shaped parts interconnected with one another by connecting webs, one of said braking surfaces being on one disk-shaped part and the other braking surface being on the other disk shaped part, wherein hollow ventilating spaces delimited by said disk-shaped parts are formed between adjacent connecting webs, wherein said recesses extend through said disk-shaped parts into said hollow ventilating spaces, and wherein each of said recesses extend into said hollow ventilating spaces in such a manner as to intersect with portions of said connecting webs.

13. A brake disk according to claim 12, wherein said recesses extend completely through said brake disk.

14. A brake disk according to claim 12, wherein each of said recesses extend through both of said disk-shaped parts with approximately one half of the recess cross-sectional area overlapping one of said webs.

15. A brake disk according to claim 12, wherein said two disk-shaped parts are of the same thickness, and wherein the thickness of the hollow ventilating spaces is approximately twice the thickness of one of said disk-shaped parts.

16. A brake disk according to claim 12, wherein all of said recesses are of the same size and shape.

17. A brake disk according to claim 16, wherein all of said recesses are constructed as circular cross-section bores.

18. A brake disk for vehicle disk brakes, especially for use with high performance vehicles, comprising friction surface portions having braking friction surfaces for frictionally engaging corresponding friction members of the vehicle disk brakes, and a plurality of recesses extending inwardly into said friction surface portions from said braking friction surfaces for aiding in the cooling of the brake disk, wherein said recesses are arranged in a substantially uniform pattern along a plurality of dividing lines interconnecting the centers of adjacent recesses, each of said dividing lines being of curved vane-wheel blade shape and being spaced from one another to exhibit a vane-wheel configuration when viewed in a plane parallel to said braking surfaces, wherein said braking surfaces are formed as two oppositely facing parallel annular shaped surfaces arranged at respective opposite sides of said brake disk, wherein said brake disk is constructed of two disk shaped parts interconnected with one another by connecting webs, one of said braking surfaces being on one disk-shaped part and the other braking surface being on the other disk shaped part, wherein hollow ventilating spaces delimited by said disk-shaped parts are formed between adjacent connecting webs, wherein said recesses extend through said disk-shaped parts into said hollow ventilating spaces, and wherein each of said recesses extend into said hollow ventilating spaces in such a manner as to intersect with portions of said connecting webs.

19. A brake disk according to claim 18, wherein said recesses extend completely through said brake disk.

20. A brake disk according to claim 18, wherein each of said recesses extend through both of said disk-shaped parts with approximately one half of the recess cross-sectional area overlapping one of said webs.

21. A brake disk according to claim 18, wherein said two disk-shaped parts are of the same thickness, and wherein the thickness of the hollow ventilating spaces is approximately twice the thickness of one of said disk-shaped parts.

22. A brake disk according to claim 18, wherein all of said recesses are of the same size and shape.

23. A brake disk according to claim 22, wherein all of said recesses are constructed as circular cross-section bores.

24. A brake disk according to claim 18, wherein said connecting webs extend along said dividing lines.

25. A brake disk according to claim 24, wherein said recesses are all constructed as similar size cylindrical bores, and wherein adjacent recesses along a particular dividing line are spaced from one another a distance corresponding to the diameter of said recesses.

26. A brake disk according to claim 24, wherein adjacent recesses along a particular dividing line are spaced from one another a distance corresponding to the diameter of said recesses.

27. A brake disk according to claim 26, wherein said two disk-shaped parts are of the same thickness, and wherein the thickness of the hollow ventilating spaces is approximately twice the thickness of one of said disk-shaped parts.

* * * * *